United States Patent
Sriram et al.

(10) Patent No.: US 6,792,031 B1
(45) Date of Patent: Sep. 14, 2004

(54) METHOD FOR MAINTAINING TIMING IN A CDMA RAKE RECEIVER

(75) Inventors: Sundararajan Sriram, Dallas, TX (US); Yuan Kang Lee, Richardson, TX (US); Katherine G. Brown, Coppell, TX (US); Zhenguo Gu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 618 days.

(21) Appl. No.: 09/691,576

(22) Filed: Oct. 18, 2000

(51) Int. Cl.[7] .......................... H04B 1/69; H04B 1/707; H04B 1/713
(52) U.S. Cl. ...................... 375/147; 370/320; 370/335; 370/342; 398/78
(58) Field of Search .................. 375/147; 370/320; 341/50; 708/190; 714/732

(56) References Cited

U.S. PATENT DOCUMENTS 6,282,230 B1 * 8/2001 Brown et al. ............... 375/140
6,567,017 B2 * 5/2003 Medlock et al. ............. 341/50
6,639,907 B2 * 10/2003 Neufeld et al. ............. 370/342

* cited by examiner

Primary Examiner—Stephen Chin
Assistant Examiner—Harry Vartanian
(74) Attorney, Agent, or Firm—Ronald O. Neerings; Wade James Brady, III; Frederick J. Telecky, Jr.

(57) ABSTRACT

A system and method for maintaining timing in a CDMA rake receiver has a global chip counter that counts CDMA signal chips as they arrive at the CDMA rake receiver. A local pseudo-noise (PN) sequence replica of the incoming CDMA signal is generated and used to perform a sliding window correlation of the locally generated PN sequence replica with the incoming signal to correlate the CDMA signal timing relative to stored CDMA signal chip counts. The PN sequence timing is maintained relative to GCC, which avoids having to keep track of absolute time within each Rake finger.

23 Claims, 5 Drawing Sheets

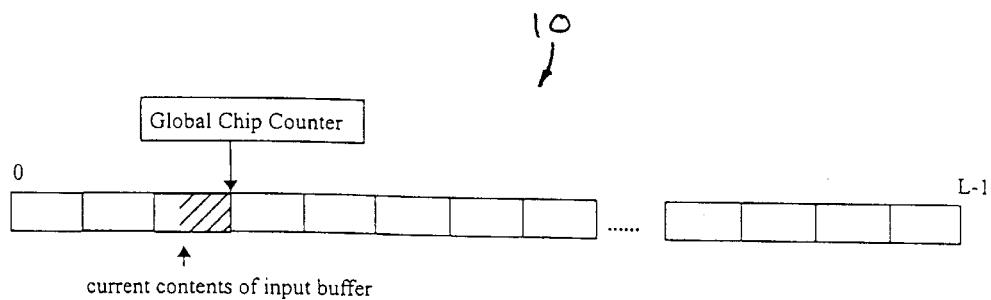
Figure 1. Global chip counter
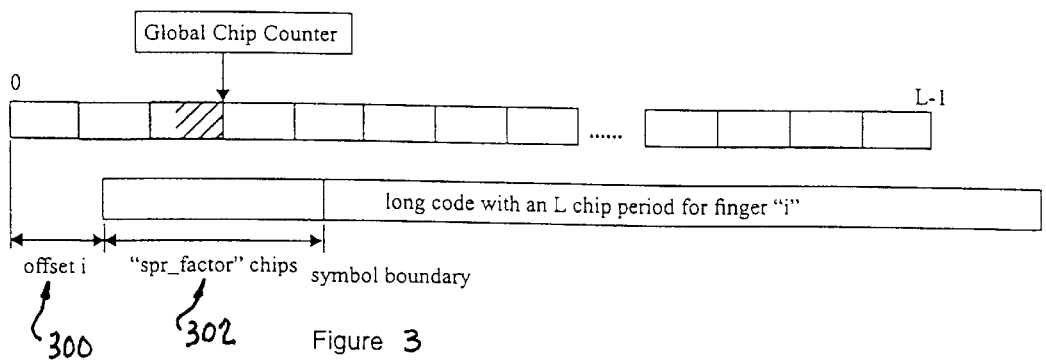
Figure 3

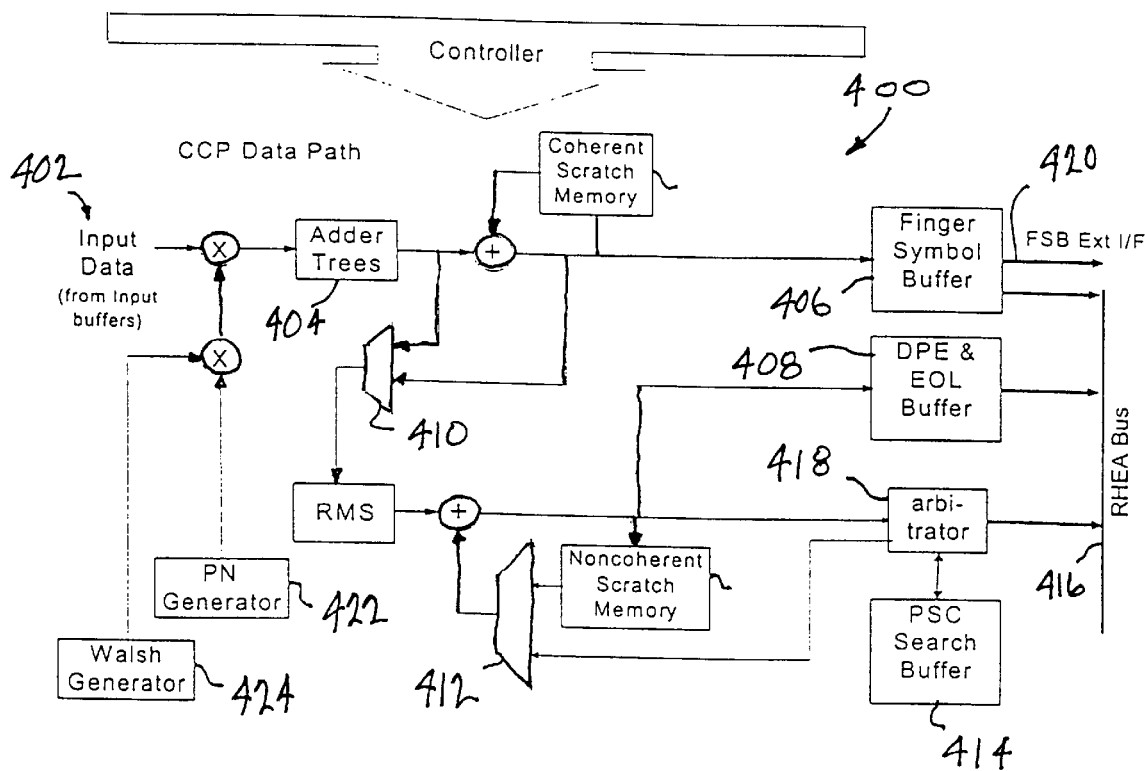
Figure 4 CCP Data Path

METHOD FOR MAINTAINING TIMING IN A CDMA RAKE RECEIVER

RELATED PATENT APPLICATIONS

This application is related to U.S. patent application Ser. No. 09/607,410 entitled Correlator Co-Processor For CDMA RAKE Receiver Operations, filed on Jun. 9, 2000, by Katherine G. Brown et al.

BACKGROUND OF THE INVENTION

1. Field of the Invention

This invention relates generally to data communication systems and methods, and more particularly to a method for maintaining timing in a CDMA rake receiver.

2. Description of the Prior Art

When using a data communication system based on bursts (packets), the generic format of a frame consists of a preamble at the beginning of each burst. Some communication protocols additionally include data and end-of-frame. The preamble is used to signify (recognize) the start of transmission. All nodes on a network traditionally use the same preamble and the same end-of-frame. Each node, therefore, is required to decode at least the beginning of the data to identify if this message is addressed to itself. Decoding efforts importantly require a real-time computational complexity. Further, traditional data communication processes are made even more complex and time consuming due to the necessity to utilize collision detection and resolve techniques.

Further, in code division multiple access (CDMA) systems, as well as others, there are overlaying coded data streams, each having its own frame timing. In view of the foregoing, it is therefore desirable to provide a technique to maintain timing in a CDMA rake receiver.

SUMMARY OF THE INVENTION

The conventional method for maintaining timing in a CDMA receiver is to let each Rake finger maintain absolute time, and count out chip, slot, and frame boundaries. Each component has its own free running counter that maintains path offset information. In this situation, the control device (usually a microcontroller or programmable DSP) then must explicitly load the path timing information obtained from the searcher hardware into each Rake finger. Since all timing is absolute, the microcontroller software must determine the values of various hardware counters that maintain finger timing.

The present invention on the other hand maintains a single counter (GCC) that tracks the chip samples as they come into the receiver; and all timing in the system is specified in terms of timing offsets from this global (or central) counter. This avoids the problem of software having to determine the hardware state of various counters that may be running at several Gigahertz speeds. All finger timings are specified in terms of offsets, and the hardware fingers use the value of the GCC counter to infer their absolute time. This eases system design, and allows a very flexible implementation of the receiver (e.g. the number of fingers can be easily scaled, the search window can be increase, etc. with minimal system level changes).

One embodiment of the present invention is more specifically directed to a system and method for maintaining timing in a CDMA rake receiver for supporting high bit rate data communication systems such as the correlator co-processor (CCP) disclosed in U.S. patent application Ser. No. 09/607,410 entitled Correlator Co-Processor For CDMA RAKE Receiver Operations, docket no. TI-30639, filed on Jun. 9, 2000, by Katherine G. Brown et al., incorporated by reference herein. The CCP is capable of receiving multiple in-phase (I) and quadrature (Q) signal samples from multiple sources to accommodate antenna diversity wherein I and Q samples may be 6-bits or more. The I and Q samples further represent multiple overlaying channels, each of which have several multi-path elements, the aggregate data rate being possibly greater than the chip rate. According to one embodiment, a hardware counter counts the incoming CDMA signal samples (or "chips"). The counter is called a "Global Chip Counter" or GCC. The GCC counts modulo the period of the pseudo-noise (PN) sequence used to spread the CDMA signal. It counts the samples of the CDMA signal ("chips") as they arrive at the receiver and are written into an input buffer such as described in U.S. patent application Ser. No. 09/648,184, entitled Triple Data Buffer System for High Data Rate Communication Systems, docket no. TI-30696, filed on Aug. 25, 2000, by Katherine G. Brown, incorporated by reference herein. All timing in the CDMA receiver is then specified relative to the GCC. The searcher provides path timing, also relative to the GCC. These path timings may then be transferred to RAKE fingers. In the event that the finger allocation is performed in software, the software process does not need to know the precise timing in the hardware. Since the path timings are specified relative to GCC, the hardware can compute the precise timing by adding the relative timing value to the current value of GCC.

According to one embodiment, a method of maintaining timing in a CDMA rake receiver comprises the steps of:
  a) providing a GCC counter;
  b) counting via the GCC counter, CDMA signal chips as they arrive at a CDMA rake receiver;
  c) generating a local pseudo-noise sequence replica of the incoming CDMA signal;
  d) performing a sliding window correlation of the locally generated PN sequence replica with the incoming signal to correlate the CDMA signal timing relative to stored CDMA signal sample count values; and
  e) specifying finger timing offsets relative to the stored CDMA signal sample count values to allocate RAKE fingers to the strongest multipath components.

According to yet another embodiment, a system for maintaining timing in a CDMA rake receiver comprises:
  a correlator co-processor including a pseudo-noise (PN) generator for generating a PN sequence replica of an incoming CDMA signal; a Walsh code generator for generating Walsh codes; at least one chip counter (GCC) configured to count CDMA signal samples; at least one data input buffer configured to receive and store CDMA chips; a data path configured to receive and process samples of the PN sequence replica samples of the Walsh codes and CDMA chip samples; at least one task buffer configured to store a list of programmably executable tasks; an interrupt generator; at least one configuration table buffer in communication with the at least one task buffer and configured to store a plurality of configuration tables that specify how each task within the list of programmably executable tasks is implemented; at least one configuration table buffer having at least one input in communication with an external system interface bus; at least one output data buffer; and a controller in communication with the data path; and
  an algorithmic software, wherein the controller in communication with the data path, the at least one task buffer, the at least one configuration table, the interrupt generator, the PN code generator, the Walsh code generator, the GCC and the at least one output buffer and directed by the algorithmic software is operational to correlate a locally generated PN sequence replica with an incoming CDMA signal such that CDMA signal timing is correlated relative to GCC chips counts and further operational to specify finger offsets relative to GCC chip counts such that RAKE fingers are allocated to the strongest multipath components.

In one aspect of the invention, a Global Chip Counter is implemented to accommodate CDMA receiver timing functions.

In still another aspect of the invention, a method is implemented to more easily maintain timing in a CDMA rake receiver.

In yet another aspect of the invention, a Global Chip Counter is implemented that allows a software process to allocate RAKE fingers to the strongest multipath components simply by specifying finger offset relative to GCC, without making an explicit reference to the current value of the time-base maintained in hardware.

Still another aspect of the invention is associated with a method that allows determination of CDMA signal parameters such as current slot number within a frame, and occurrence of slot and frame boundaries through knowledge of the current value within a Global Chip Counter and knowledge of the finger timing offset.

As used herein, "algorithmic software" means an algorithmic program used to direct the processing of data by a computer or data processing device; wherein data processing device refers to a CPU, DSP, microprocessor, microcontroller, or other like device and an interface system in which the interface system provides access to the data processing device such that data can be entered and processed by the data processing device.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein:

FIG. 1 is a diagram illustrating a Global Chip Counter (GCC);

FIG. 3 is a top level block diagram illustrating a correlator co-processor (CCP) system in communication with a GCC;

FIG. 4 is a simplified block diagram illustrating a CCP Data Path structure;

While the above-identified drawing figure sets forth a particular embodiment, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

FIG. 1 is a diagram illustrating a Global Chip Counter (GCC) buffer 10 that can be used to maintain timing in a CDMA rake receiver. As stated herein before, a CDMA rake receiver keeps track of timing between various multipath components, wherein the multipath timing is determined using a path search or delay profile estimation function familiar to those skilled in the art of CDMA signals and communication techniques. There are several well known search techniques (generally hardware based) that provide the multipath profile information. Such hardware provides multipath information to a data processing device such as a DSP, that in turn determines which paths to despread and the path offsets from the delay profile information provided by the searcher hardware. The strongest multipath components are assigned to RAKE "fingers" that perform a despreading operation on each multipath component.

Figure 2:
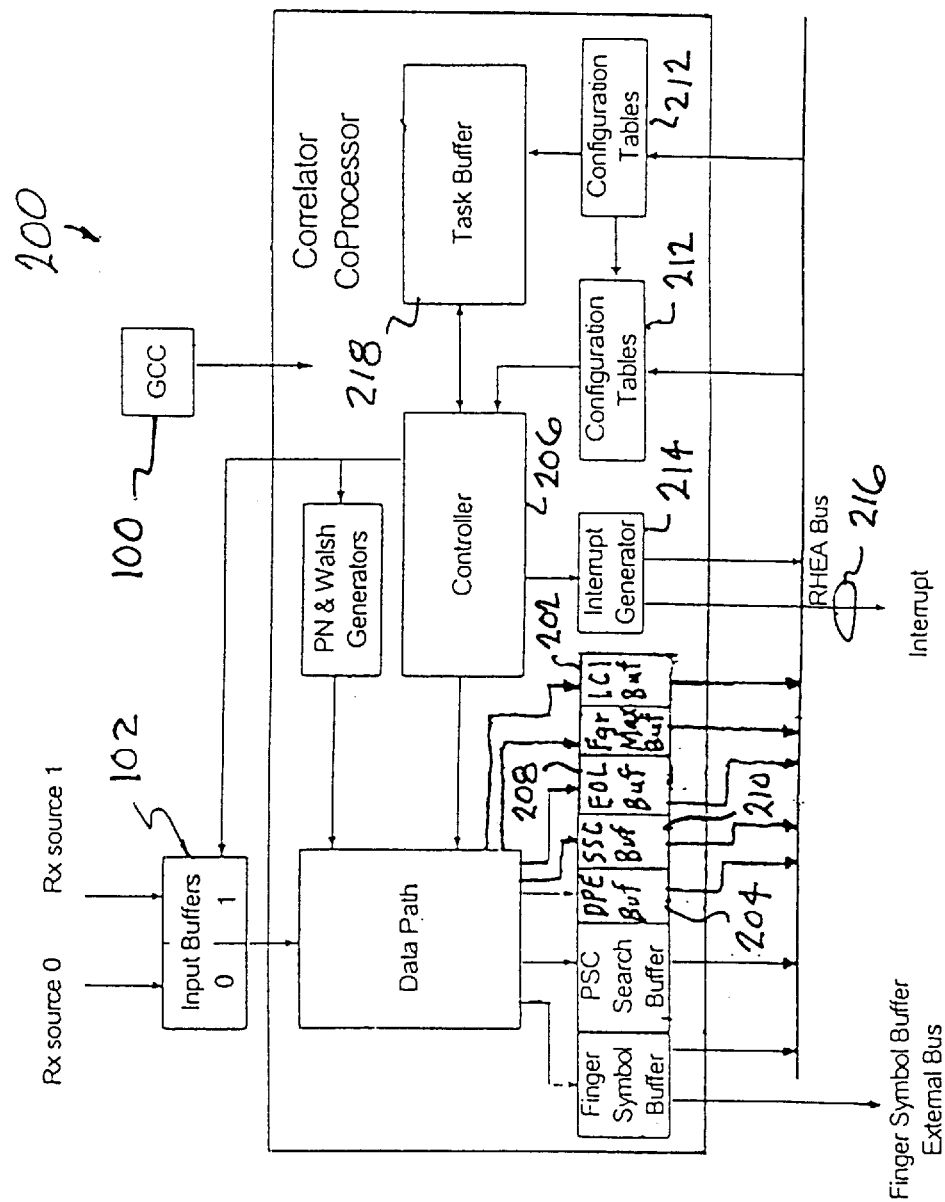
FIG. 2 is a diagram illustrating timing offset ("offset i") of "finger i", that tracks a particular multipath component.

In order to maintain timing between the various CDMA rake receiver components, a Global Chip Counter (GCC) 100 such as depicted in FIG. 2 is introduced. FIG. 2 is a top-level block diagram illustrating a correlator co-processor (CCP) system 200 in communication with a GCC 100. The GCC 100 counts modulo the period of the pseudo-noise (PN) sequence used to spread the CDMA signal (this period is "L" in FIG. 1). Specifically the GCC 100 counts the samples of the CDMA signal ("chips") as they arrive at the receiver and are written into an input buffer 102, discussed above. All timing in the receiver is specified relative to the GCC 100. The searcher, discussed above, provides path timing, also relative to the GCC 100. These path timings can then be transferred to RAKE fingers. As also stated herein before, in the event that the finger allocation is performed in software, the software process does not need to know the precise timing in the hardware. The path timings are specified relative to the GCC 100 count value; and the hardware can compute the precise timing by adding the relative timing value to the current count value of GCC 100. All timing in the coprocessor (CCP) 200 is relative to the GCC 100 count value, including the searcher and RAKE finger offsets.

FIG. 3 is a diagram illustrating the timing offset ("offset i" 300) of "finger i", that tracks a particular multipath component. The timing offsets (e.g. offset i 300) are determined by means of a search function that performs a sliding window correlation of a locally generated PN sequence replica with the incoming signal. The searcher reports its timings relative to the GCC 100 count value as well; and this allows a software process to allocate RAKE fingers to the strongest multipath components simply by specifying finger offsets relative to the GCC 100 count value without making an explicit reference to the current value of the time-base maintained in hardware.

Using the stored GCC 100 count value and the offset value (e.g. offset i 300), it can then be determined if there is a symbol boundary for "finger i" in the input buffer 102 at any given time, and if so, to determine the tree partitions. If each symbol spans spreading_factor chips 302, then the condition for existence of a symbol boundary can be defined as:

Symbol boundary present if $[GCC-\text{offset}(i)]$ modulo spreading_factor<buff_size  (1)

where buff_size is the size of the input buffer 102.

A CDMA signal is typically divided into frames and slots as stated herein before. The present GCC-based timing allows the determination of parameters such as current slot number within a frame, and occurrence of slot and frame boundaries. Such parameters can be determined, for example, through knowledge of the current count value of the GCC 300 and the knowledge of the finger timing offset (offset(i)); simple arithmetic manipulations similar to Equation (1), using the current GCC 300 count value and offset(i) yield the desired information.

FIG. 4 is a simplified block diagram illustrating a CCP 200 Data Path structure 400 according to one embodiment of the present invention, and is described herein below with reference also to FIG. 2 in order to further exemplify a system according to one embodiment that is suitable to implement the present method for maintaining timing in a CDMA rake receiver. The CCP 200 accumulates bits and writes despread symbols to memory at different stages of the Data Path 400. The input data 402 (from the input buffers 102) is obtained via an A/D converter (not shown) of some number (typically 5–6 bits). After passing through Adder Trees 404, there are 17 data bits. At this point, some bits are discarded. Before writing symbols to the Finger Symbol Buffer 406, 9 MSB's are discarded, with saturation, for symbol finger=4; or 1 MSB is discarded, with saturation, for other symbol fingers. Regarding the symbols passed into the remainder of the Data Path 400 (e.g. DPE & EOL Buffer 408), 4 MSB's and 2 LSB's are discarded, with saturation. Following coherent accumulation 410, there are 22 bits. Of these 22 bits, 18 bits are kept starting from $(13+\max(5, \log2(Ns)))^{th}$ LSB, wherein Ns is the number of symbols of coherent accumulation. Following non-coherent accumulation 412, there are 32 bits. Of these 32 bits, 24 bits are kept starting from $(13+\max(5, \log2(N_{NS})))^{th}$ LSB, wherein $N_{NS}$ is the number of non-coherent accumulations.

The PSC Search Buffer 414 serves two purposes. First, it stores running energy values while the PSC search task is active. In this regard, it is used as accumulator memory by the CCP 200. Second, when the PSC search task is finished, it stores the final energy values, which can then be read by the host processor, i.e. DSP. One energy value per ½-chip offset is returned, thereby resulting in a total of 5120 energy values for a time slot having 2560 chips. According to one embodiment, the PSC search task requires a post-processor (not shown), to acquire the 5120 energy values; where the PSC Search Buffer 414 is dedicated for intermediate first stage values which would be read by the aforesaid post-processor. While the PSC search task is active, the PSC Search Buffer 414 is accessible only by the CCP Data Path 400. When the PSC search task is inactive, the PSC Search Buffer 414 is accessible only via DSP Bus 416(can be either RHEA or External Memory Interface(EMIF) communication bus). An arbitrator 418 handles access rights. Further, an interrupt may be generated upon completion of a PSC task.

The DPE & EOL Buffer(s) 408 and LCI Buffer 202 store DPE and LCI search results respectively. They are directly readable via the DSP Bus 416 at all times. The DPE Buffer 204 and LCI Buffer 202 (depicted in FIG. 2) are single-buffered, and new results over-write old ones. When new results are ready, they may be read on the DSP Bus 416 directly by the host processor or by Controller 206. Task-based interrupts can be generated when new results are ready. When a DPE task finishes, for example, an interrupt may be generated.

The EOL Buffer 208 stores finger EOL measurement results. It is directly readable via the DSP Bus 416 at all times. The EOL Buffer 208 is also single-buffered, and as with the DPE Buffer 204, new result over-write old ones. When new results are ready, they may be read on the DSP Bus 416 directly the host processor or by Controller 206. The finger task can issue various slot-based interrupt events that can be used to signal the availability of new EOL data.

The Finger Symbol Buffer 406 stores complex I and Q "symbols" that result from finger tasks. All symbols such as pilot, TPC, data and the like, are stored here after they are received and processed by the CCP Data Path 400. The Finger Symbol Buffer 406 is implemented as a multi-slot circular buffer for each Walsh channel. The Finger Symbol Buffer 406 serves as intermediate storage for downstream symbol-rate processing. The size of the Finger Symbol Buffer 406 is preferably a compromise between area and the rate at which data must be moved to where downstream processing takes place. The Finger Symbol Buffer 406 is also accessible on a FSB External Bus 420 that may be used when downstream processing and/or storage take place outside of the host processor (e.g. DSP system).

Regarding the PN Generator 422 and Walsh Code Generator 424, a CCP 200 task specifies a PN code ("Gold code") and a Walsh code to be generated as well as a code offset. The PN/Walsh Code generators 422, 424 then generate a block of the specified PN/Walsh codes starting from the specified code offset. Gold code generation is centralized and can be produced for any correlation cycle. No LFSR state nor "mask" need to be specified, as the code number and offset from a global chip counter (GCC 100) is available, as described herein above. Both "block" and "serial" Gold code generation methods are preferably employed to minimize power dissipation. The 16×16 WCDMA PSC and SSC Buffers 414, 210 have programmable parameters to be specified for use in association with PSC and SSC search operations.

With continued reference to FIG. 2, the Controller 206 is responsible for actually implementing each of the CCP 200 tasks, and generating appropriate control signals for the Data Path 400. Diverse correlations can importantly be implemented simply by varying the control sequence. Downstream control and Data Path 400 pipeline stages are most preferably gated off to conserve power when no tasks are running.

Local timing reference for the CCP 200 is maintained via a global chip counter (GCC 100) discussed herein before, that counts the incoming chip samples as they are written into the input buffer(s) 102. The GCC 100 counts modulo the length of a WCDMA long code. All timing in the CCP 200 is relative to the GCC 100 count value, including offsets used in rake receiver operations.

The CCP 200 uses a number of configuration tables 212 to specify how it executes each of its tasks. Some tables are used globally, while others are associated with certain tasks. One configuration table, for example, contains the position and size of the pilot symbols for each spreading factor. Another configuration table contains the Walsh codes associated with a particular finger task. Configurations are provided directly by the host processor.

Interrupt Generator 214 generates three types of interrupts including task-based interrupts, system interrupts and error interrupts. Each CCP 200 task can generate at least one interrupt. When a DPE task finishes, for example, it may generate an interrupt. Each finger task can generate a number of interrupts, for example, to indicate the end of a radio slot or the reception of a transmit-power-control (TPC) symbol. Task-based interrupts are mainly used by the host processor for data retrieval, but may be for other software/hardware synchronization purposes. Task-based interrupts place status information in one of four interrupt FIFO registers. Each interrupt FIFO register is tied to one of the interrupt lines 216 coming from the CCP 200. System interrupts indicate global CCP 200 events. A task-based interrupt, for example, signals the host processor that task updates are completed. An error interrupt is generated whenever an error condition is detected.

The Task Buffer 218 contains a list of tasks that the CCP 200 executes. The Task Buffer 218 is read directly by the CCP 200 in order to determine the CCP's current tasks. The Task Buffer 218 is a ping/pong buffer with an individual control for the ping/pong status of each entry in the Task Buffer 218. Swapping from ping to pong or vice-versa occurs on a task-update boundary. A task-update interrupt tells the host processor when the transfer completes, and that the updated status bits are available for each task. This mechanism allows a synchronization between the host processor and the CCP 200 which prevents incomplete tasks being read by the CCP 200.

Figure 5:
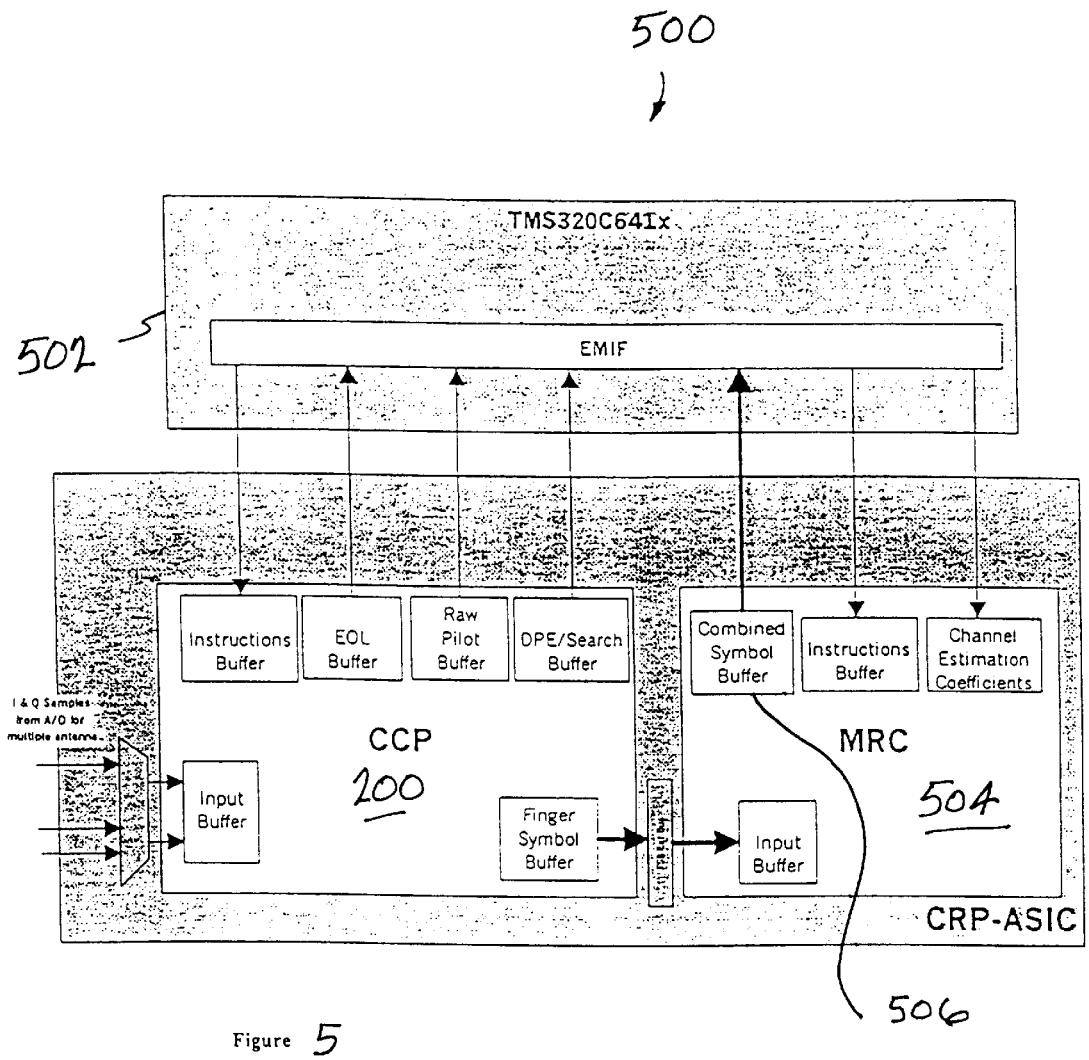
FIG. 5 illustrates one implementation of a CDMA receiver comprising the CCP shown in FIG. 3, a digital signal processor (DSP), and a maximal-ratio combining (MRC) ASIC and that is suitable to implement the present method.

FIG. 5 illustrates one implementation of a CDMA receiver 500 comprising the CCP 200 shown in FIG. 2, a digital signal processor (DSP) 502, and a maximal-ratio combining (MRC) ASIC 504 and that is suitable to implement the present method. The MRC function can alternatively be implemented in software. The CCP 200 is responsible for 1) performing the de-spreading necessary to provide data symbols per finger to the entity (e.g. DSP 502, ASIC 504) in charge of the MRC processing, 2) performing EOL energy measurements of a delay locked loop, 3) performing on-chip and ½-chip correlations and energy measurements for DPE and search purposes, and 4) providing raw pilot symbols per finger to the DSP 502. The DSP 502 uses the computed raw pilot symbols to perform the channel estimation of each finger. Coefficients of the channel estimation are then sent to the entity in charge of the MRC processing (e.g. ASIC 504). Using those computed coefficients, the MRC ASIC 504 multiplies de-spread symbols with the channel estimation coefficients and then sums the symbols coming from various fingers (paths) together to provide combined symbols in the Combined Symbol Buffer 506.

Figure 6:
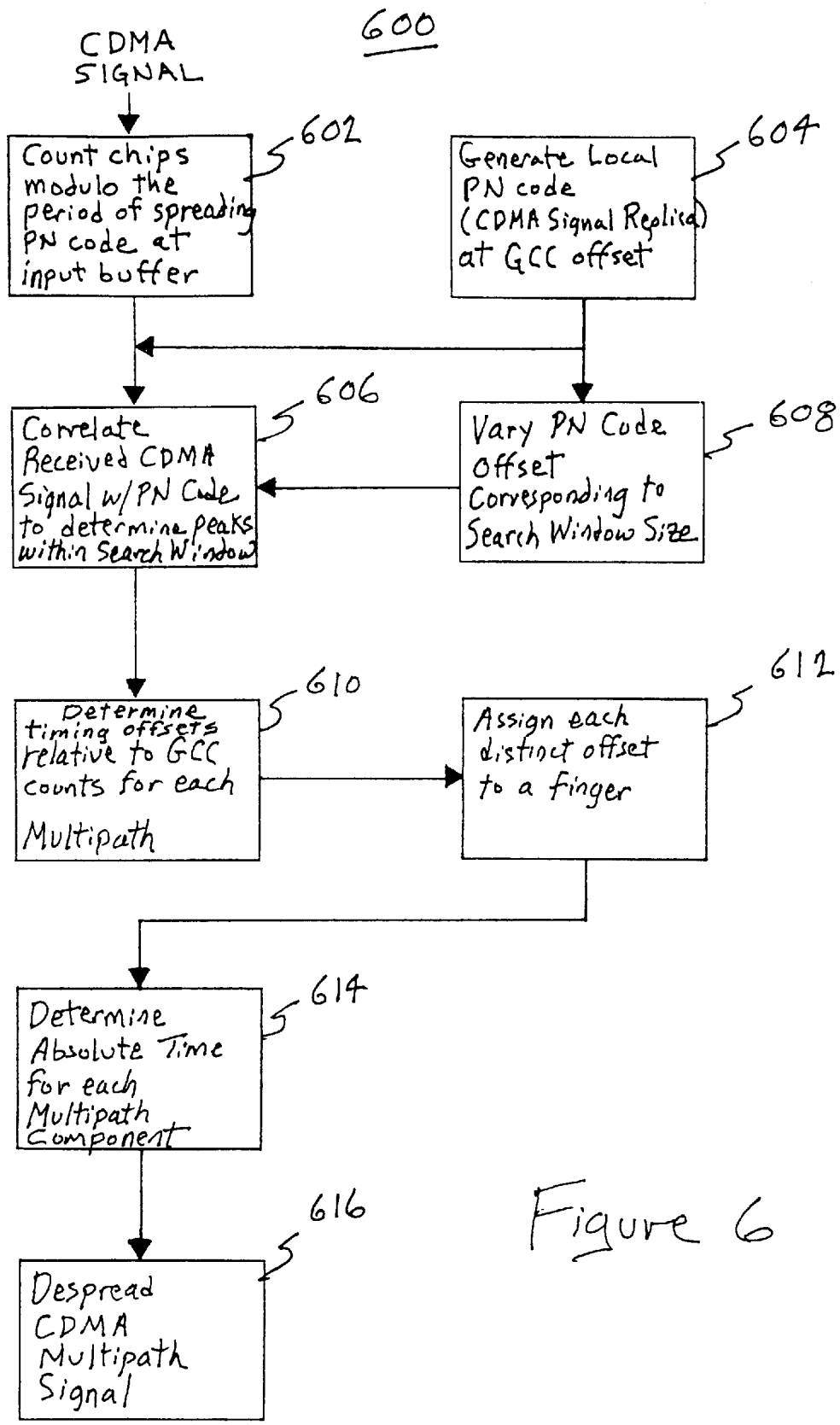
FIG. 6 is a flow diagram illustrating a method according to one embodiment of the present invention.

FIG. 6 is a flow diagram 600 illustrating a method for maintaining timing in a CDMA rake receiver according to one embodiment of the present invention and that can be implemented in a CDMA rake receiver that employs the CCP 200 depicted in FIG. 2. The method begins by first counting chips modulo the period of the received CDMA signal spreading PN code as indicated at block 602. The received CDMA signal is received into one or more data buffers 102 as described herein before in association with FIG. 2. The aforesaid chips are counted modulo the period of the received CDMA signal spreading PN code via a local GCC counter 100, also described herein before in association with FIG. 2. A local PN code, being a CDMA signal replica, is generated at the CDMA rake receiver via a PN Generator 422 discussed herein above in association with FIG. 4. The local PN code is generated having an offset determined by the GCC counter 100 as shown in block 604, and is subsequently correlated with the incoming CDMA chips as shown in block 606, to determine whether the incoming CDMA signal is generated at an offset equal to that established by the GCC counter 100. The PN offset associated with the local PN code is also varied in accordance with the search window size (offset not equal to GCC offset) as shown in block 608 and then correlated as shown in block 606 to determine peaks in the resulting correlation values obtained throughout the search window showing the presence of signal multipaths. Offsets relative to the GCC counter 100 are then associated with each signal multipath as shown in block 610. Each multipath is assigned to a distinct finger as shown in block 612 in which the Rake can determine absolute time from the relative offset values as shown in block 614. Since the offsets are with respect to GCC 100, the agent that sets up the rake (e.g., DSP) does not need to know the absolute hardware time, or even the GCC count value. It simply specifies the offsets to the Rake receiver; since the Rake has the GCC counter 100 value available to it, the Rake can determine absolute time from the relative offset values (depicted in block 614). Having obtained the aforesaid timing information, the Rake receiver can then despread the CDMA multipath signal as shown in block 616.

In view of the above, it can be seen the present invention presents a significant advancement in the art of CDMA and WCDMA information processing. A system and method have been described for maintaining timing in a CDMA rake receiver. Further, this invention has been described in considerable detail in order to provide those skilled in the data communication art with the information needed to apply the novel principles and to construct and use such specialized components as are required. In view of the foregoing descriptions, it should further be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of maintaining timing in a Code Division Multiple Access(CDMA) rake receiver comprising the steps of:
    providing a CDMA rake receiver global chip counter (GCC) that counts modulo the period of a spreading PN code;
    counting via the GCC counter CDMA signal chips as they arrive at a CDMA rake receiver;
    generating a local CDMA rake receiver pseudo-noise (PN) sequence replica of an incoming CDMA signal;
    correlating received CDMA signal timing relative to GCC counter CDMA chip counts via correlation of the locally generated PN sequence replica with the incoming CDMA signal; and
    allocating RAKE fingers to the strongest multipath components via specifying finger timing offsets relative to GCC counter CDMA chip counts.

2. The method according to claim 1 wherein the step of correlating received CDMA signal timing relative to GCC counter CDMA chip counts comprises performing a sliding window correlation of the locally generated PN sequence replica with the incoming CDMA signal.

3. The method according to claim 1 wherein the step of generating a local CDMA rake receiver pseudo-noise (PN) sequence replica of an incoming CDMA signal comprises generating a PN code having a timing offset equal to a GCC count value.

4. The method according to claim 1 wherein the step of generating a local CDMA rake receiver pseudo-noise (PN) sequence replica of an incoming CDMA signal comprises generating a PN code having a plurality of timing offset values corresponding to a search window size, wherein each timing offset value is specified relative to a GCC count value.

5. The method according to claim 4 wherein the step of allocating RAKE fingers to the strongest multipath components via specifying finger timing offsets relative to GCC counter CDMA chip counts comprises determining peaks in correlation values obtained in the search window and associating offset values with respect to GCC count values for each peak thereof.

6. The method according to claim 5 wherein the step of allocating RAKE fingers to the strongest multipath components via specifying finger timing offsets relative to GCC counter CDMA chip counts further comprises associating each multipath component having a distinct timing offset value with a specific finger.

7. The method according to claim 6 wherein the step of allocating RAKE fingers to the strongest multipath components via specifying finger timing offsets relative to GCC counter CDMA chip counts further comprises despreading each CDMA multipath signal.

8. A method of maintaining timing in a correlator co-processor-based Code Division Multiple Access(CDMA) rake receiver comprising the steps of:

counting via a correlator co-processor CDMA signal chip counter CDMA chips as they arrive at a CDMA rake receiver;

generating via a correlator co-processor pseudo-noise (PN) sequence generator a local PN sequence replica of an incoming CDMA signal;

correlating the locally generated PN sequence replica with the incoming CDMA signal; and specifying finger offsets relative to global chip counter (GCC) chip counts.

9. The method according to claim 8 further comprising the step of allocating RAKE fingers to strongest multipath components.

10. The method according to claim 9 wherein the step of correlating comprises performing a sliding window correlation of the PN sequence replica with the incoming CDMA signal.

11. The method according to claim 9 wherein the step of allocating RAKE fingers to the strongest multipath components comprises determining peaks in correlation values obtained in a search window and associating timing offsets with respect to GCC count values for each peak thereof.

12. The method according to claim 9 wherein the step of generating a local CDMA rake receiver PN sequence replica of an incoming CDMA signal comprises generating a PN code having a timing offset equal to a GCC count value.

13. The method according to claim 9 wherein the step of generating a local CDMA rake receiver PN sequence replica of an incoming CDMA signal comprises generating a PN code having a plurality of timing offset values relative to GCC count values and corresponding to a search window size.

14. The method according to claim 13 wherein the step of allocating RAKE fingers to the strongest multipath components comprises associating each PN code having a distinct timing offset value with a distinct finger.

15. The method according to claim 14 further comprising the step of determining absolute time of each multipath component relative to the GCC count values.

16. The method according to claim 15 further comprising the step of despreading each CDMA multipath signal.

17. A system for maintaining timing in a Code Division Multiple Access(CDMA) rake receiver comprising:

a correlator co-processor having
a pseudo-noise (PN) generator for generating a PN sequence replica of an incoming CDMA signal; a Walsh code generator for generating Walsh codes;
at least one global chip counter (GCC) configured to count CDMA signal samples;
at least one data input buffer configured to receive and store CDMA chips;
a data path configured to receive and process samples of the PN sequence replica samples of the Walsh codes and CDMA chip samples;
at least one task buffer configured to store a list of programmably executable tasks;
an interrupt generator;
at least one configuration table buffer in communication with the at least one task buffer and configured to store a plurality of configuration tables that specify how each task within the list of programmably executable tasks is implemented, at least one configuration table buffer having at least one input in communication with an external system interface bus; at least one output data buffer; and a controller in communication with the data path; and
an algorithmic software, wherein the controller in communication with the data path, the at least one task buffer, the at least one configuration table, the interrupt generator, the PN code generator, the Walsh code generator, the GCC
and the at least one output buffer and directed by the algorithmic software is operational to correlate a locally generated PN sequence replica with an incoming CDMA signal such that CDMA signal timing is correlated relative to GCC chip counts and further operational to specify finger offsets relative to GCC chip counts such that RAKE fingers are allocated to strongest multipath components.

18. The system according to claim 17 wherein the external system interface bus is a External Memory Interface(EMIF) communication bus.

19. The system according to claim 17 wherein the data path comprises a plurality of multipliers, a plurality of adder trees, at least one coherent accumulator, a post-processing element, and temporary data storage elements such that the data path can perform predetermined RAKE receiver functions.

20. The system according to claim 19 wherein the controller, directed by the algorithmic software, is further operational to perform a sliding window correlation of a locally generated PN sequence replica with an incoming CDMA signal.

21. The system according to claim 20 wherein the controller, directed by the algorithmic software, is further operational to vary a PN timing offset to correspond with a desired search window size such that peaks in correlation values can be determined and associated with CDMA signal multipaths within the search window.

22. The system according to claim 21 wherein the controller, directed by the algorithmic software, is further operational to associate timing offset values relative to the GCC count value with each peak such that the RAKE receiver can determine absolute time values for each CDMA multipath.

23. The system according to claim 22 wherein the controller, directed by the algorithmic software, is further operational to despread each CDMA multipath signal.

* * * * *